United States Patent [19]

Ozeki

[11] Patent Number: 4,733,485
[45] Date of Patent: Mar. 29, 1988

[54] DESKTOP FILM VIEWER
[75] Inventor: Jiro Ozeki, Tokyo, Japan
[73] Assignee: Slidex Corporation, Tokyo, Japan
[21] Appl. No.: 811,823
[22] Filed: Dec. 20, 1985
[30] Foreign Application Priority Data Jul. 20, 1985 [JP] Japan ................................ 60-159296

[51] Int. Cl.⁴ ............................................. G02B 27/02
[52] U.S. Cl. ..................................... 40/361; 40/152.2;
40/365; 362/97; 350/235
[58] Field of Search ................. 40/361, 362, 363, 364,
40/365, 152.2; 350/267, 235, 238; 362/97

[56] References Cited
U.S. PATENT DOCUMENTS

| 2,436,162 | 2/1948 | Cadenas | 40/361 |
| 4,335,421 | 6/1982 | Modia et al. | 40/361 |
| 4,468,873 | 9/1984 | Ozeki | 40/361 |
| 4,564,886 | 1/1986 | Morcheles | 40/361 |
| 4,589,659 | 5/1986 | Yokoi | 40/365 |

FOREIGN PATENT DOCUMENTS

| 1162175 | 4/1958 | France | 40/361 |
| 41-5799 | 3/1966 | Japan . | |

Primary Examiner—Gene Mancene
Assistant Examiner—Wenceslao J. Contreras
Attorney, Agent, or Firm—Fleit, Jacobson, Cohn & Price

[57] ABSTRACT

A desktop film viewer includes a box-shaped structure consisting of a cover member and a main member fitted with each other, a light transmission diffusion plate provided on the cover member, and a light source and reflectors provided in the main member to illuminate the light transmission diffusion plate. The box-shaped structure comprises wedge-shaped side surfaces. At the acute angle edges of the wedge-shaped side surfaces, the main member and the cover member are pivotally connected to each other. The box-shaped structure further comprises foldable linked stays for maintaining the box-shaped structure opened at any angles.

17 Claims, 12 Drawing Figures

FIG_1a
PRIOR ART
FIG_1b
PRIOR ART
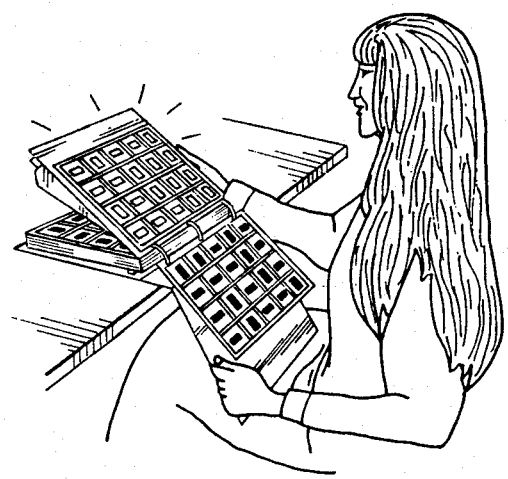

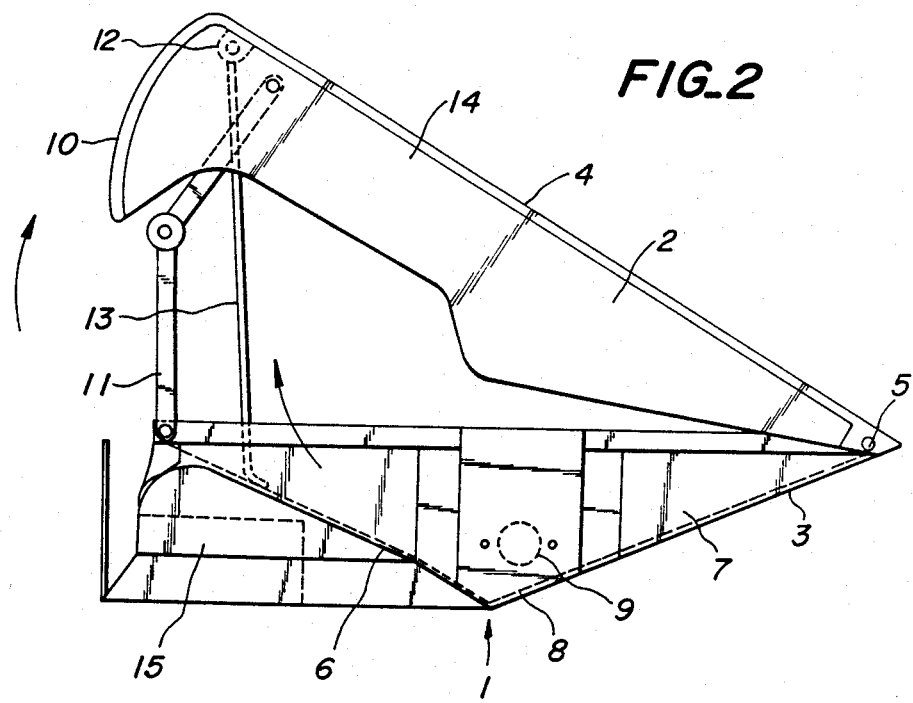
FIG_2
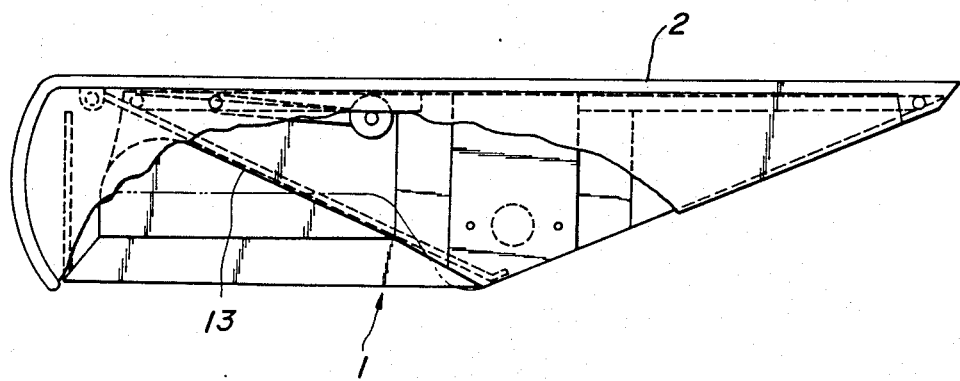
FIG_3

FIG_4
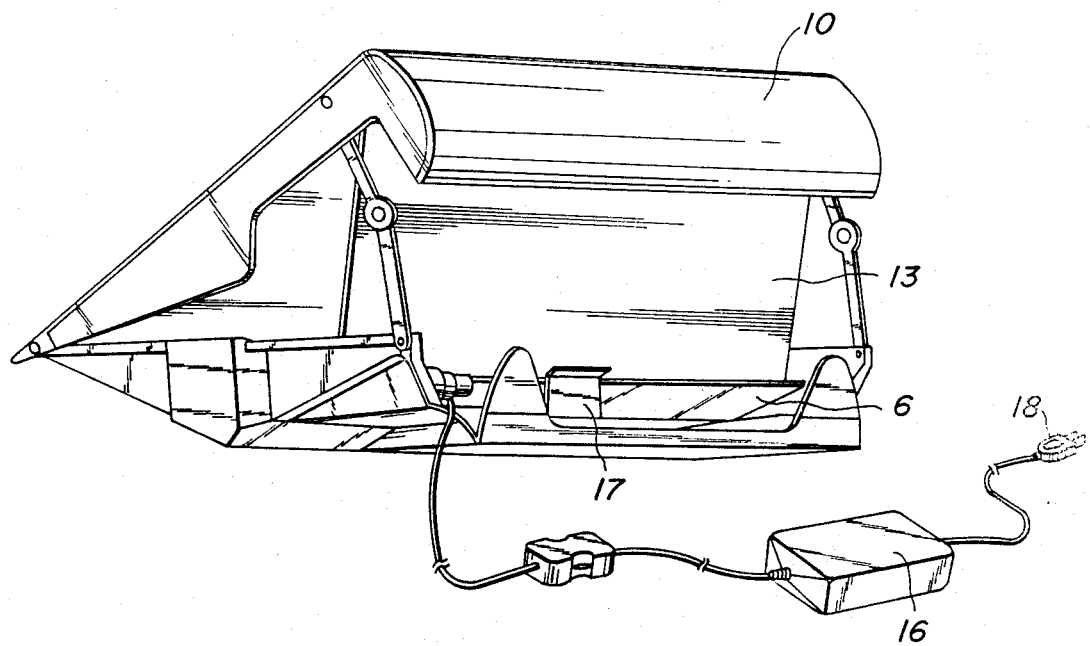
FIG_5
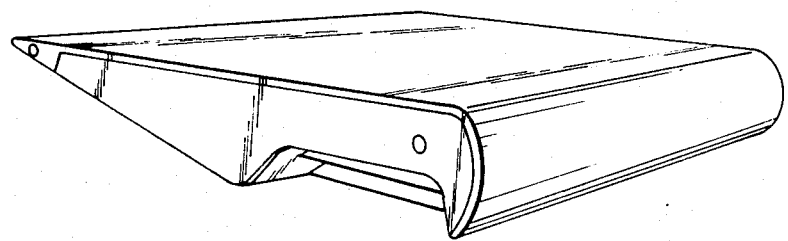

FIG_6
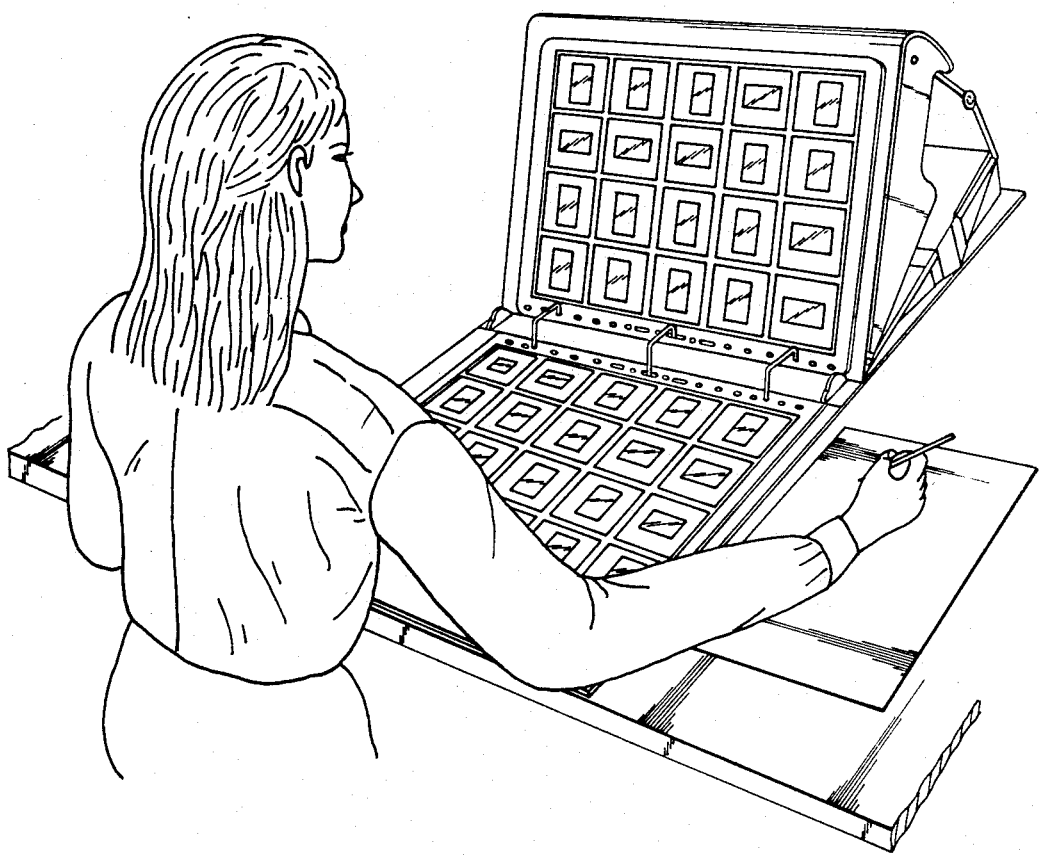

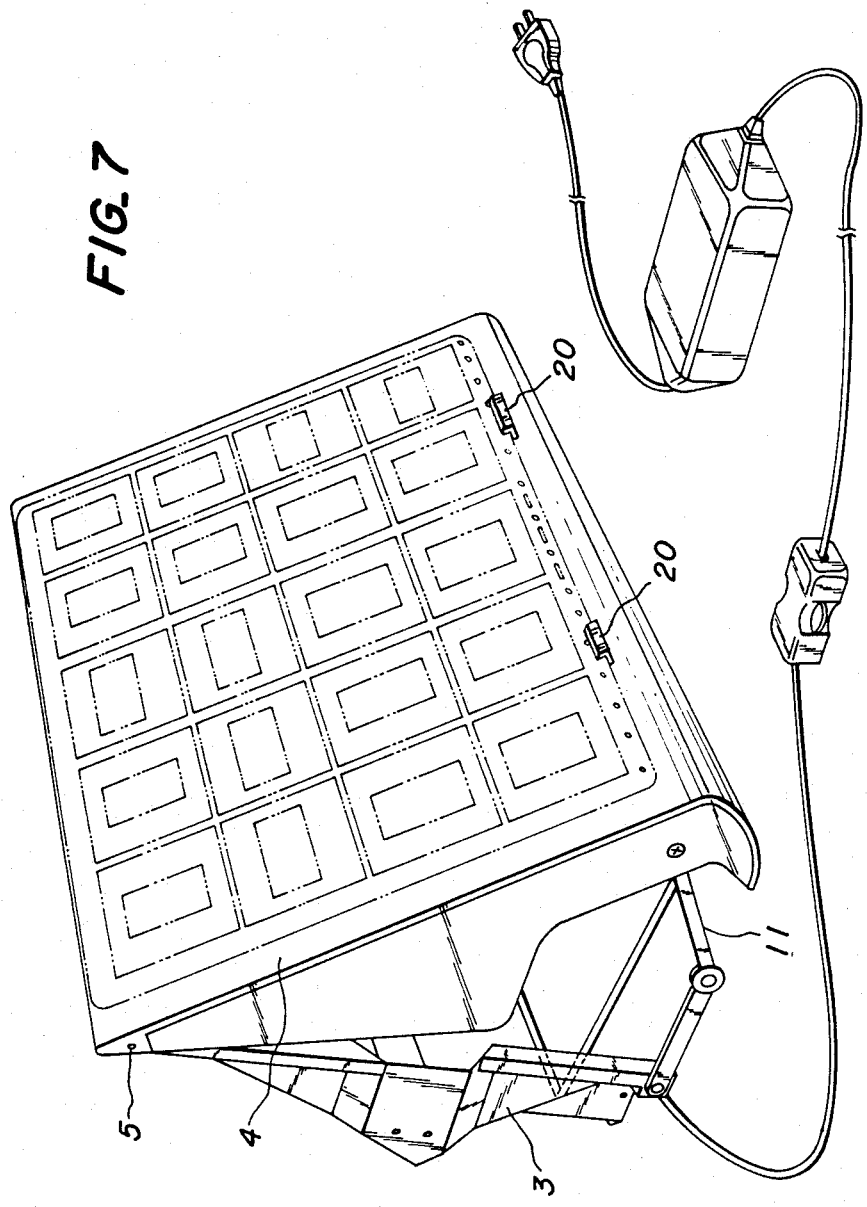

FIG_8a
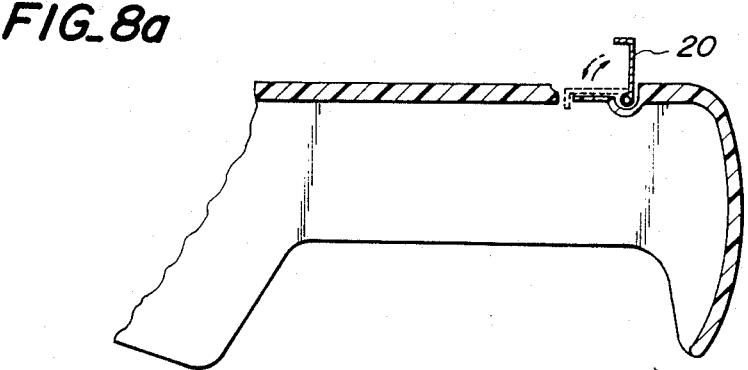
FIG_8b
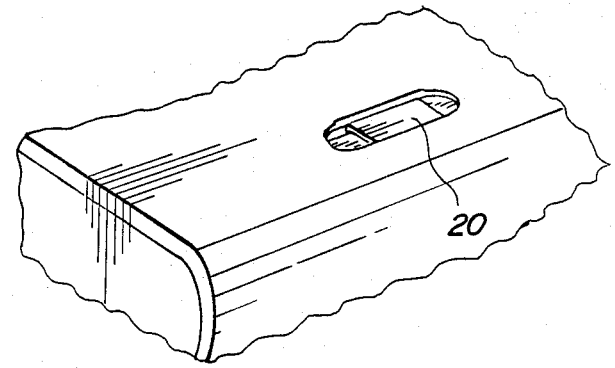
FIG_8c
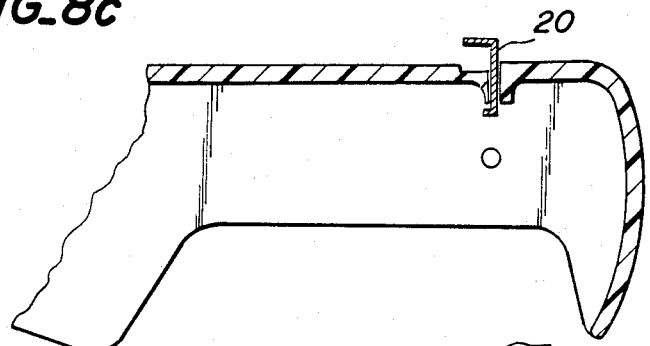
FIG_8d
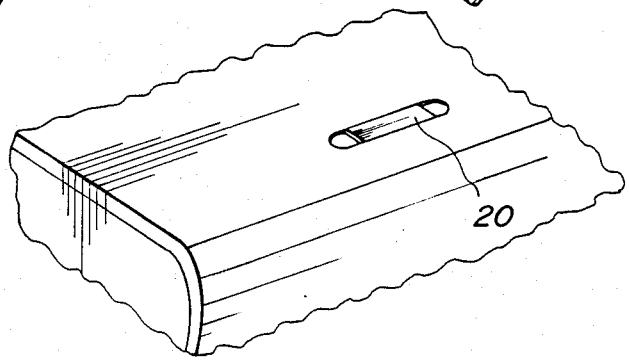

DESKTOP FILM VIEWER

BACKGROUND OF THE INVENTION

This invention relates to a desktop viewer for transparent images, and more particularly to an improvement of a desktop film viewer to facilitate viewing of positive or negative transparencies for checking and finding desired ones from a large number of transparencies.

A typical desktop film viewer for transparent images of the prior art comprises a housing in the form of a rectangular parallelepiped having a light source such as fluorescent lamp housed therein and closed at a top by a transmission diffusion plate which transmits light but simultaneously diffuses the light.

This viewer exhibits its effective function when the transparencies are arranged on a horizontal diffusion plate for viewing them. However, a user of the viewer cannot effectively view the transparencies without removing files bound as a binder containing the transparencies or in an inclined condition of the transparencies at a particular angle facilitating the user's viewing. This difficulty results from edge walls having at least 5–6 cm height surrounding the circumference of the viewer. Accordingly, the user cannot select his viewing manner at will.

The inventor has proposed a desktop film viewer which was patented as U.S. Pat. No. 4,468,873. The proposed desktop film viewer comprises a wedge-shaped housing having a bottom wall, an inclined top with a diffusion plate and sidewalls enclosing a space between the bottom wall and the top, so that the housing can be inserted between file sheets of a binder bound like an album. A light source is located at a center of a rectangular portion connecting the highest ends of the sidewalls and a main reflector an inside of a bottom of the housing. Sub-reflectors are located on insides of the tapered or triangular sidewalls and auxiliary reflectors are arranged above and below the light source. These reflectors forms a composite reflector. By tilting the auxiliary reflectors at suitable angles, the transmission diffusion plate is uniformly illuminated by the light source with the aid of the composite reflector. Accordingly, after the housing has been inserted between file sheets, a user can view the transparencies clearly irrespectively of the relatively shallow housing.

With such a desktop film viewer, the user can view the transparencies properly under the condition of the binder opened on right and left sides as illustrated in FIG. 1a. However, in case of the binder opened forward and rearward as illustrated in FIG. 1b, a target page is located remote from eyes of the user, so that the user must pivotally raise the target page until it assumes a position near to the user sufficient to facilitate the viewing of the user. Accordingly, the operation of the viewer having the comparatively shallow housing is troublesome.

SUMMARY OF THE INVENTION

It is a principle object of the invention to provide an improved desktop film viewer which eliminates all the disadvantages of prior art.

It is another object of the invention to provide a desktop film viewer which enables a user to view images of file sheets bound in a binder without removing one of the file sheets from the binder and makes it facilitate to view the images by tilting a transmission diffusion plate at suitable angles at will even if the binder is opened on front and rear sides of the user.

It is a further object of the invention to provide a desktop film viewer which, when a box-shaped structure is opened, a transmission diffusion plate is tilted at steeper angles to facilitate user's viewing.

In order to achieve these objects, in a desktop film viewer including a box-shaped structure consisting of a cover member and a main member fitted with each other, a light transmission diffusion plate provided on the cover member, and a light source and reflectors provided in the main member to illuminate the light transmission diffusion plate, according to the invention the box-shaped structure comprises wedge-shaped side surfaces at which acute angle edges the main member and the cover member are pivotally connected to each other and support means for maintaining the cover member opened relative to the main member. The main member preferably comprises a bottom wall in the form of an opened V-shape in cross-section. In this case, below one wall forming one bottom wall of the V-shaped bottom wall there is preferably provided with a partition frame for accommodating a transformer for the light source and cords.

In a preferred embodiment of the invention, the cover member is provided on a side opposite to the acute angle edges with an end wall substantially perpendicular to the cover member and curved outwardly to form a convex wall like a spine of a book.

An inner surface of the bottom wall of the main member is preferably coated with a light reflecting substance.

In a preferred embodiment, the cover member is provided in its inside on a side opposite to the acute angle edges with a reflecting plate freely depending therefrom. In a further embodiment, the cover member is provided on its outer surface with supports movable into concealed position and supporting position for supporting a file sheet including films to be viewed when the cover member is inclined for viewing.

In order that the invention may be more clearly understood, preferred embodiments will be described, by way of example, with reference to the accompanying drawings.

BRIEF DESCRIPTION OF THE DRAWINGS

FIG. 1a is a perspective view illustrating a desktop viewer of the prior art which is being used;

FIG. 1b is a perspective view illustrating the desktop viewer of the prior art being used in a different manner;

FIG. 2 is a side view of a desktop film viewer according to the invention under opened condition;

FIG. 3 is a side view of the desktop film viewer under closed condition;

FIG. 4 is a perspective view of the desktop film viewer shown in FIG. 2;

FIG. 5 is a perspective view of the desktop film viewer shown in FIG. 3;

FIG. 6 is a perspective view showing one used condition of the desktop film viewer according to the invention;

FIG. 7 is a perspective view illustrating another used condition of the desktop film viewer according to the invention; and FIGS. 8a–8d illustrate two embodiments of supports of the desktop film viewer according to the invention for supporting a file sheet including films to be viewed.

DESCRIPTION OF THE PREFERRED EMBODIMENTS

FIG. 2 illustrates one embodiment of the desktop film viewer for transparent images according to the invention. This desktop film viewer comprises a box-shaped structure 1 consisting of a main member 3 and a cover member 2 whose side surfaces are substantially in the form of wedges. An upper surface of the cover member 2 is made of a transmsision diffusion plate 4 so that incident light beams are diffused at and transmitted through the diffusion plate 4, thereby enabling transparent images to be viewed. The cover member 2 is pivotally connected by hinge pins 5 to the main member 3 at the proximities of sharply extending corners of the box-shaped structure so as to permit the cover member 2 to pivotally move relative to the main member 3.

The main member 3 has a bottom wall 6 in the form of an opened V-shape in cross-section. In other words, the bottom wall 6 is bent substantially along its center line at obtuse angles. One surface of the bottom wall 6 near to the hinge pins 5 is in parallel with a surface of a desk or table when the viewer has been inserted in file sheets of a binder. On both ends of the bottom wall there are provided substantially triangular sidewalls 7 perpendicular to the bottom wall 6 and having projections 8.

Each projection 8 is provided with a socket (not shown) into which is inserted a light source, for example, a fluorescent lamp extending perpendicular to a surface of FIG. 2. The fluorescent lamp is preferably of low output (8 W) in order to obtain light beams similar to natural light beams.

The cover member 2 is provided on a side opposite to the hinge pins 5 with an end wall 10 substantially perpendicular to the transmission diffusion plate 4. The end wall 10 is preferably curved outwardly to form a convex wall. With this arrangement, when the desktop viewer is housed in a bookshelf, the end wall 10 seems to be as if it were a spine of a book to obtain an esthetical stored condition. In other words, the end wall 10 effectively exhibits a beauty of design of the viewer.

In order to maintain the box-shaped structure opened at any angles, support means 11 is provided which connects the cover member 2 and the main member 3 in this embodiment. As shown in FIG. 2, for example, the support means 11 consists of two stays made of a metal foldably linked with each other. Ends of the stays not linked are pivotally connected to a sidewall 14 of the cover member and the sidewall of the main member 3, respectively. The pivoted positions of the support means are not limited to those shown in FIG. 2 and may be at any other locations. Moreover, the support means 11 may be a stay having one end provided with a hook and the other end pivotally connected to the cover member 2 or main member 3. The foldable or collapsible support means 11 shown in FIG. 2 can be maintained at any angles between the stays with the aid of the friction at the link connection. If it is required to ensure the keeping of the angles, a stopper may be provided at the link connection. The opened angles are preferably those at which a user can see the file with ease, which are approximately 60°.

An inner surface of the bottom wall 6 of the main member 3 is coated with a light reflecting substance, so that the inside of the transmission diffusion plate 4 is illuminated by the light beams emitted from the light sources 9 and reflected by the inner surface of the bottom wall 6 coated with the light reflecting substance. Moreover, the cover member 2 is provided on the end opposite to the hinge pins 5 with two brackets 12 each having a circular aperture. To the brackets 12 is pivotally connected a rectangular reflecting plate 13 at its one end. The non-pivotal end of the reflecting plate 13 freely depends from the pivotal end, so that the non-pivotal end of the reflecting plate 13 slides on the reflecting surface of the bottom wall 6 of the main member 3 when the cover member 2 is being closed or opened. This pivotal reflecting plate 13 assumes the position shown in FIG. 2 when the cover member 2 is opened and the position shown in FIG. 3 when the cover member 2 is closed where the reflecting plate 13 sits on the surface of the bottom wall 6 remote from the hinge pins 5. In this manner, not only under closed condition but also opened condition of the cover member 2, the light beam which would leak at the opened cover member 2 are returned to the transmission diffusion plate by means of the reflecting plate 13 without lowering the illuminance at the part of the inside of the transmission diffusion plate remote from the light sources 9, thereby uniformly illuminating the inside of the transmission diffusion plate.

FIG. 4 is a perspective view of the viewer as viewed from the side of the end wall. Referring back to FIG. 2, below the surface of the bottom wall 6 of the main member 3 on the side of the end wall, there is provided partition frame 15 dividing the surface of the bottom wall 6 and the surface of the desk when the viewer is arranged on the desk. The partition frame 15 is provided at a center of its bottom wall with a U-shaped elastic piece 17 for fixing a transformer 16 which is generally called "stabilizer" and enables the fluorescent lamp to stably emit the light beams. In order to make light the weight of the viewer itself, the transformer is provided in lead wires or cords connecting the fluorescent lamp to the plug 18 near to the plug 18 separately from the light source.

With this arrangement, when the transformer 16 is fixed to the elastic piece 17, the cords, the plug 18 and others can be housed in the partition frame 15. Accordingly, when the box-shaped structure 1 is closed, these parts can be snugly housed in the structure. Moreover, parts other than the transformer 16 may be housed in the space surrounded by the V-shaped bottom wall 6, the sidewalls 7 and the transmission diffusion plate 4. Glow lamps for putting on the fluorescent lamps and their sockets other than the above described parts are also housed in the partition frame 15.

FIGS. 5-7 illustrate the used condition of the viewer according to the invention. FIG. 5 shows the viewer with the cover member 2 closed. The viewer is now supported with the edge of the end wall 10 and the bottom wall of the partition frame 15 by the desk to keep the transmission diffusion plate 4 horizontally. Under this condition, the user can view transparent positions and negatives in the usual manner which have been removed from the binder and arranged on the horizontal transmission diffusion plate.

FIG. 6 illustrates a viewer according to the invention used with a binder which includes images arranged at right angles to other images and is opened on front and rear side of a user. In this manner, the cover member 2 is opened at an angle facilitating the user's viewing and supported by the foldable stay 11, and therefore manual adjustment of angles of the viewer is not needed.

FIG. 7 illustrates a different used condition of the viewer according to the invention. The viewer is stood on a desk such that the pivotal end of the cover member 2 is upper and the end wall 10 is lower. In this case, the transmission diffusion plate is formed near to the end wall with recesses and grooves, and L-shaped supports 20 are pivotally provided in the recesses as shown in FIGS. 8a and 8b. When the L-shaped supports 20 are pivotally moved to extend outwardly, a file sheet removed from a binder is supported by the extending L-shaped supports. In other words, the L-shaped supports are pivotally moved into a concealed position and a supporting position.

As shown in FIGS. 8c and 8d, moreover, each support 20 may be formed in an L-shape having a small stoppage 22 for preventing the support from removing from a slot formed in the transmission diffusion plate. With the arrangements shown in FIGS. 8a–8d, a file sheet removed from a binder or transparent images are supported by the supports 20 and viewed in steeper angles than those in FIG. 6.

As can be seen from the above description, the desktop film viewer for transparent images according to the invention makes it possible to view images of file sheets bound in a binder without removing one of the file sheets from the binder and make it facilitate to view the images by tilting the transmission diffusion plate at any angle even if the binder is opened on front and rear sides of a user. It is of course possible to view images in a horizontal position of the transmission diffusion plate as in the conventional manner. Moreover, when the box-shaped structure is opened, the transmission diffusion plate is tilted at steeper angles to facilitate the viewing of films. The desktop viewer according to the invention can be used in various used conditions.

It is further understood by those skilled in the art that the foregoing description is that of preferred embodiments of the disclosed viewer and that various changes and modifications may be made in the invention without departing from the spirit and scope thereof.

What is claimed is:

1. A desktop film viewer comprising:
    a box-shaped structure having a cover member and a main member interfitting with each other,
    a light transmission diffusion plate provided on said cover member,
    a light source provided in said main member to illuminate said light transmission diffusion plate of said cover member,
    a light reflecting surface located in said main member to reflect light from said light source onto said light transmission diffusion plate,
    a reflecting plate suspended from said cover member for reflecting light onto said light transmission diffusion plate, said reflecting plate having two ends, one end being pivotably mounted on said cover member and the other end being slidably mounted on said light reflecting surface of said main member,
    said box-shaped structure includes wedge-shaped side surfaces having acute angle edges where said main member and said cover member are pivotally connected to each other, and
    support means for adjusting an angle of inclination of said cover member relative to said main member.

2. A desktop film viewer as set forth in claim 1, wherein said main member comprises a bottom wall in the form of an opened V-shape in cross-section.

3. A desktop film viewer as set forth in claim 1, wherein said cover member is provided on a side opposite to the acute angle edges with an end wall substantially perpendicular to the cover member and curved outwardly to form a convex wall like a spine of a book.

4. A desktop film viewer as set forth in claim 1, wherein an inner surface of said bottom wall of said main member is coated with a light reflecting substance.

5. A desktop film viewer as set forth in claim 2, wherein below one wall forming one bottom wall of said V-shaped bottom wall there is provided with a partition frame for accommodating a transformer for the light source and cords.

6. A desktop film viewer comprising:
    a box-shaped structure having a cover member and a main member interfitting with each other,
    a light transmission diffusion plate provided on said cover member,
    a light source and reflectors provided in said main member to illuminate said light transmission diffusion plate of said cover member,
    said box-shaped structure includes wedge-shaped side surfaces having acute angle edges where said main member and said cover member are pivotally connected to each other, and
    support means for maintaining said cover member opened relative to said main member, said cover member includes in its inside, on a side opposite to said acute angle edges, a reflecting plate freely depending therefrom.

7. A desktop film viewer as set forth in claim 6, wherein said main member comprises a bottom wall in the form of an opened V-shape in cross-section.

8. A desktop film viewer as set forth in claim 6, wherein said cover member is provided on a side opposite to the acute angle edges with an end wall substantially perpendicular to the cover member and curved outwardly to form a convex wall like a spine of a book.

9. A desktop film viewer as set forth in claim 6, wherein an inner surface of the bottom wall of said main member is coated with a light reflecting substance.

10. A desktop film viewer as set forth in claim 7, wherein below one wall forming one bottom wall of said V-shaped bottom wall there is provided a partition frame for accommodating a transformer and power cords for the light source.

11. A desktop film viewer as set forth in claim 6, wherein said cover member is provided on its outer surface with supports movable into a concealed position and a supporting position for supporting a file sheet including films to be viewed when the cover member is inclined for viewing.

12. A desktop film viewer comprising:
    a box-shaped structure having a cover member and a main member interfitting with each other,
    a light transmission diffusion plate provided on said cover member,
    a light source and reflectors provided in said main member to illuminate said light transmission diffusion plate of said cover member,
    said box-shaped structure includes wedge-shaped side surfaces having acute angle edges where said main member and said cover member are pivotally connected to each other, and
    support means for maintaining said cover member opened relative to said main member, said cover member includes on its outer surface, supports movable into a concealed position and a supporting position for supporting a file sheet including films to be viewed when the cover member is inclined for viewing.

13. A desktop film viewer as set forth in claim 12, wherein said main member comprises a bottom wall in the form of an opened V-shape in cross-section.

14. A desktop film viewer as set forth in claim 12, wherein said cover member is provided on a side opposite to the acute angle edges with an end wall substantially perpendicular to the cover member and curved outwardly to form a convex wall like a spine of a book.

15. A desktop film viewer as set forth in claim 12, wherein an inner surface of said bottom wall of said main member is coated with a light reflecting substance.

16. A desktop film viewer as set forth in claim 12, wherein said cover member is provided in its inside on a side opposite to said acute angle edges with a reflecting plate freely depending therefrom.

17. A desktop film viewer as set forth in claim 13, wherein below one wall forming one bottom wall of said V-shaped bottom wall there is provided a partition frame for accommodating a transformer and power cords for the light source.

* * * * *